Dec. 31, 1968   J. K. APAT   3,418,855
APPARATUS FOR TESTING SHARPNESS OF NEEDLES
Filed May 31, 1966
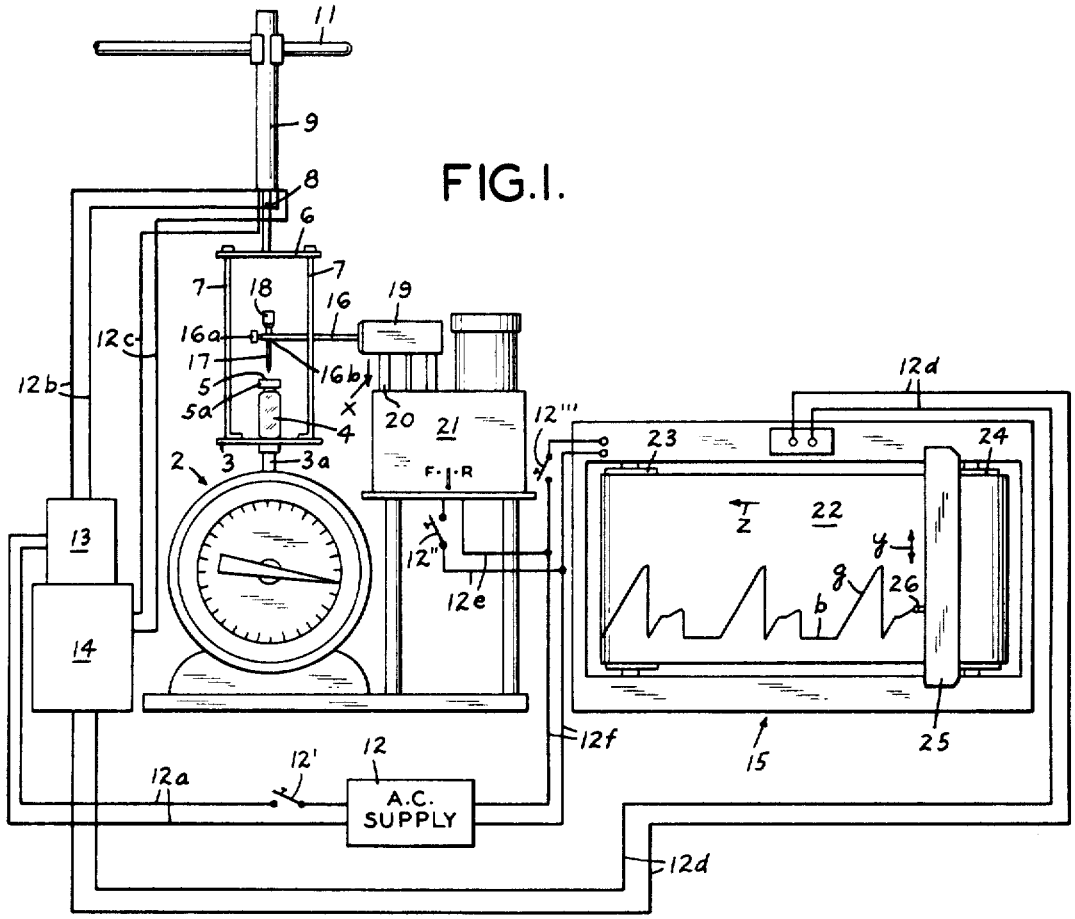
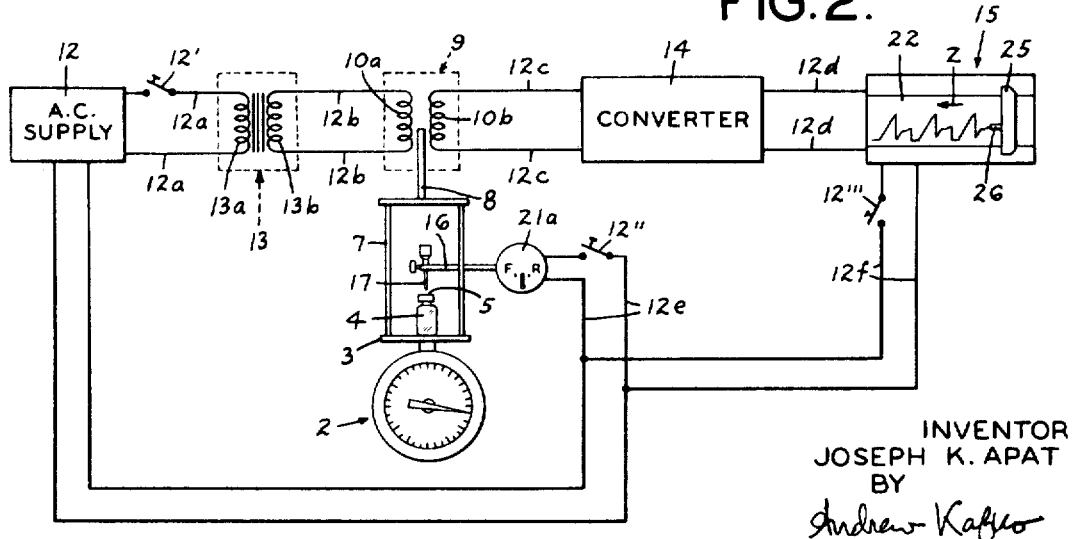
INVENTOR
JOSEPH K. APAT
BY
Andrew Kafko
ATTORNEY

United States Patent Office 3,418,855
Patented Dec. 31, 1968

3,418,855
APPARATUS FOR TESTING SHARPNESS OF NEEDLES
Joseph K. Apat, Chester, Pa., assignor to American Home Products Corporation, New York, N.Y., a corporation of Delaware
Filed May 31, 1966, Ser. No. 553,894
8 Claims. (Cl. 73—432)

ABSTRACT OF THE DISCLOSURE

Apparatus for testing the sharpness of needles comprising a penetrable diaphragm mounted on a resilient support, and a constant speed motor for advancing the needle to be tested toward and into abutment with the diaphragm. The linear displacement of the resilient support is recorded on an electric recorder as a measure of sharpness of the needle.

---

This invention relates generally to measuring devices, and more particularly to apparatus for testing the sharpness of needles, especially those of the hollow type known also as cannulae, which are used in hypodermic injection devices.

Hypodermic injection devices comprising a hollow needle or cannula mounted on a syringe structure are disclosed in USP 791,802, USP 2,671,449, and USP 2,994,323, for example, and are so well known that no further description of them is necessary herein. Various refinements have been made in the structure of said needles per se for advantageously changing the sharpness characteristics thereof toward the purpose of achieving the most efficacious penetrating function for ease of use by the doctor and minimization of the pain to, and apprehension of, the patient. Regardless of the innovation in structure; uniformity in the sharpness of the hypodermic needles is difficult to achive, since the needles, used literally in the millions per year, must of course, be mass-produced. In accordance with the known procedures for achieving some standardization or sharpness, this is presently done subjectively, as by examining physically (for example, by microscope) the contours of randomly chosen needles. The drawbacks and insufficiencies of such tedious and subjective procedures are self-evident.

In consideration of the existing problem with respect to the testing of the sharpness of needles generally, as referred to above, and of the drawbacks of the known procedures; the primary object of the present invention is to provide a needle testing apparatus which is automatic in operation, thereby to render sharpness evaluations completely objective in nature.

It is another object of the invention to provide an automatic needle testing apparatus which provides a permanent recording of the sharpness-testing data obtained.

It is another object of the invention to provide an automatic needle testing appartus which may be easily prepared for initial operation and the interchanging of needle specimens to be tested.

It is yet another object of the invention to provide an automatic needle testing apparatus which is simple in structure, economical to construct, and utilizes known and available components in a unique combination.

The foregoing, as well as additional objects and advantages of the present invention, will become apparent on a better understanding of said invention to be had from the description of an embodiment thereof set forth hereinafter, when considered in connection with the accompanying drawings, wherein:

FIG. 1 is a side elevation of an assembled apparatus embodying the invention; and FIG. 2 is a schematic representation of the apparatus of FIG. 1, and particularly the electrical circuitry thereof.

Referring to FIG. 1 of the drawings, there is disclosed a needle testing apparatus which, in accordance with the present invention, comprises a weighing scale 2 having the usual balance pan 3 supported on a balance arm 3a. On balance pan 3, there is mounted a vial 4 having, as the closure therefor, a thin penetrable rubber diaphragm 5, which is maintained in taut disposition on vial 4 by means of a sealing rim 5a. A second pan 6 is mounted on the first pan 3 by means of a plurality of upwardly projecting legs 7, which extend well above the top of vial 4.

Mounted on the second pan 6, for movement therewith, is a vertically disposed core 8 of ferro-magnetic material. Core 8 is adapted to move vertically within, and as a component of, a linear variable differential transformer 9 having the usual opposed coils 10a, 10b, as illustrated in FIG. 2. Transformer 9 is mounted in stationary relationship to the remainder of the structure already described, by means of support 11. The output of a power source 12 to the input coil 13a of transformer 9, via pairs of leads 12a, 12b, is controlled by manual switch 12', and is regulated via a conventional step-down transformer 13 interposed between pairs of leads 12a, 12b, and having the usual opposed coils 13a, 13b, as also illustrated in FIG. 2. The output of transformer 9; i.e., from coil 10b thereof, is in turn regulated by a conventional converter 14 interposed in pairs of leads 12c, 12d to comply with the requirements of a recording device 15 to which leads 12d are electrically connected as shown.

A horizontally extending mounting bar 16 is provided with a manually operable clamping screw 16a for retaining, in an aperture 16b, which extends transversely through bar 16, the needle 17 to be tested. The needle 17, in this case, is shown mounted in a ferrule 18, by which it may be attached to the ampule of a syringe (not shown). Needle 17 is maintained in mounting bar 16 by the described clamping means 16a, 16b, in vertical disposition with respect to, in axial alignment with, and immediately above diaphragm 5. Mounting bar 16 is fixedly mounted on, and vertically movable with, a supporting structure 19. Supporting structure 19 is fixedly mounted on legs 20 which are supported for downward vertical movement; i.e., in the direction of arrow x, on a prime mover assembly 21, which is provided with an electrically powered motor 21a for moving legs 20 downwardly at a constant rate, and thus therewith, supporting structure 19, mounting bar 16, and the needle 17 to be tested. Thereby, needle 17 is caused to move against diaphragm 5 and ultimately to penetrate the same, as described in greater detail hereinafter. The electrical powered motor 21a of prime mover assembly 21 is also connected to power supply 12, in this case by the pair of leads 12e, in which there is interposed a manually operable switch 12''.

Recorder 15, of conventional design, comprises a roll of recording paper 22 mounted on rollers 23, 24 of which roller 23 is drivable at a constant speed by electrical powered drive means (not visible) comprised in recorder 15 and also connected to power source 12 via leads 12e, and in addition leads 12f, in which there is similarly interposed a manually operable switch 12'''. Mounted on recorder 15, by support, track and drive means 25, is a vertically movable pen 26, the vertical reciprocal movement (in the direction of two-headed arrow y) and hence disposition of which, is controlled by the aforesaid electrical input of recorder 15 via leads 12d.

In the use of the apparatus described, vial 4, with penetrable diaphragm 5 affixed under tension to the top thereof by means of rim 5a as referred to hereinbefore; is mounted centrally on pan 3 of scale 2. With support bar 16 in the position shown in FIG. 1, the needle 17 to be tested is inserted in aperture 16b in said bar 16 and clamped in position for movement with the latter by means of clamping screw 16a, so that the downwardly directed point of needle 17 overlies diaphragm 5 as shown. Upon closure of switch 12', electrical power from source 12 is supplied via leads 12a to input coil 13a of transformer 13, and then via output coil 13b thereof and leads 12b, to input coil 10a of linear variable differential transformer 9. The output of transformer 9 (via coil 10b, leads 12c, converter 14, and leads 12d) is fed to drive means 25 for recording pen 26. With balance pan 3 in the position shown in the figures of the drawings; i.e., with no pressure applied thereto by needle 17 via diaphragm 5 and vial 4; core 8 is maintained by upper pan 6 at a pre-selected position between the coils 10a, 10b of variable transformer 9, to result in a given output to converter 14, and hence a given input to recorder 15. Such input to recorder 15 results in a steady positioning vertically of recorder pen 26 with respect to recording paper 22. Upon closure of manual switch 12''', electrical power from supply 12 is supplied via leads 12e, 12f to the roller drive motor (not visible) of recorder 15 to set drive roller 23 in motion, and thus to cause horizontal translation of graph recording paper 22 in the direction of arrow z (and the transcribing of base line b). Motor 21 of prime mover 21 for needle mounting means 20, 19 and 16 is then energized by closure of switch 12'' to result in vertically directed downward movement of needle 17 at a constant rate, whereby the sharp end thereof abuts against and then forces diaphragm 5 downwardly at the same constant rate.

Initially, after contact of needle 17 with diaphragm 5, the constantly applied downward force is insufficient to cause penetration of diaphragm 5 by the needle 17. As a result, balance pan 3 (via vial 4) is urged downwardly against the normal upwardly biasing action of balance arm 3a of weighing scale 2. Concomitantly, upper pan 6 mounted on balance pan 3 moves downwardly the same distance as does the latter, and therewith also, vertically disposed core 8 mounted on pan 6. Movement of core 8 downwardly between coils 10a, 10b of variable differential transformer 9 results in diminished shielding therebetween and hence a voltage change in output coil 10b proportionate to the vertical distance moved by core 8. The alternating current voltage delivered by transformer 9 is converted to direct current by converter 14 and the output of the latter is fed via leads 12d to the drive means 25 of recorder 15 for causing proportionate (upward) vertical movement of recording pen 26 thereby to inscribe a varying graph line g on laterally moving recording paper 22. Further downward movement of needle 17 against diaphragm 5, upon meeting increasing upwardly biasing resistance of scale 2, ultimately causes puncture of diaphragm 5 by needle 17, whereby the downward movement of diaphragm 5, vial 4 and pans 3 and 6, together with core 8 diminishes and finally substantially ceases altogether when the maximum diameter of needle 17 begins to slide through the aperture made in diaphragm 5. Recorder 15 thus inscribes a running value on paper 22 which may carry calibrations whereby exact sharpness data in grams, for example, may be read, and a written record of the test is made.

As will readily be apparent, motor 21a may be reversed by actuation of switch 21b to cause lifting of support mechanism 20, 19, 16, thereby to withdraw needle 17 from diaphragm 5 so that needle 17 may be removed from bar 16 and another needle 17 tested against another diaphragm 5 provided on a similar vial 4. In this manner, the testing apparatus may be used to record the sharpness characteristics of a plurality of needles for ascertaining whether such characteristics are being maintained uniformly, perhaps on a lot to lot basis, for example.

As will appear to those skilled in the art, various modifications of the particular embodiment of the invention described above may be made without departing from the spirit and scope thereof as set forth in the appended claims.

I claim:
1. Apparatus for testing the sharpness of needles, said apparatus comprising:
    (a) a balance;
    (b) outwardly biased support means mounted on said balance;
    (c) means mounting a diaphragm on said outwardly biased support means whereby said diaphragm faces outwardly of said support means;
    (d) means for mounting a needle adjacent to, and disposed with the point thereof toward, said diaphragm;
    (e) means for urging said needle mounting means at a uniform speed towards said diaphragm, whereby the point of a needle mounted in said mounting means will be caused to abut and then to press against said diaphragm;
    (f) a linear variable differential transformer having first and second electrically cooperating components for modifying the output thereof;
    (g) means mounting said first component on said outwardly biased support means for movement therewith;
    (h) means mounting said second component in juxtaposition to said first component;
    (i) means for supplying an input potential to said linear variable differential transformer;
    (j) an electrically responsive recorder; and
    (k) means connecting the output potential of said linear variable differential transformer, as modified by the relative juxtaposition of said first and said second components thereof, with said electrically responsive recorder.

2. Apparatus as claimed in claim 1, wherein said first component of said linear variable differential transformer comprises a ferro-magnetic shield, and said second component of said linear variable differential transformer comprises a pair of opposed electrical coils between which said ferro-magnetic shield is movable.

3. Apparatus as claimed in claim 1, wherein said means for urging said mounting means at a uniform speed comprises an electric motor.

4. Apparatus as claimed in claim 1, wherein said electrically responsive recorder comprises transcribing means.

5. Apparatus as claimed in claim 4, wherein said transcribing means of said electrically responsive recorder comprises a writing implement mounted on movable mounting means, and the positioning of said mounting means varies with the output potential of said transformer.

6. Apparatus as defined in claim 5, wherein said transcribing means also comprises a long sheet of paper mounted on separately driven rollers.

7. Apparatus as defined in claim 1, wherein said outwardly biased support means comprises a balance pan, said means mounting said diaphragm is supported on said pan, said means for mounting a needle comprises a manually operable clamp, and said means for urging said mounting means at a uniform speed toward said diaphragm comprises a reversible electric motor.

8. Apparatus as defined in claim 7, wherein a needle to be tested is mounted in by said manually operable clamp.

References Cited

UNITED STATES PATENTS 2,699,540   1/1955   Hunter _____ 73—81 X

S. CLEMENT SWISHER, *Acting Primary Examiner.*

J. W. ROSKOS, *Assistant Examiner.*

U.S. Cl. X.R.

73—104